April 10, 1956 K. V. YOUNGQUIST 2,741,727

REMOTE CONTROL RADIO RECEIVER

Filed May 24, 1954

INVENTOR.
Kenneth V. Youngquist
BY
Alman S. Nelson.
ATTY.

United States Patent Office 2,741,727

Patented Apr. 10, 1956

2,741,727

REMOTE CONTROL RADIO RECEIVER

Kenneth V. Youngquist, Circle, Mont.

Application May 24, 1954, Serial No. 431,645

9 Claims. (Cl. 317—138)

This invention relates in general to radio receiving apparatus and in particular to radio receivers for remote control.

The subject of control of objects at a distance by radio has been of interest in numerous fields for many years. One area wherein a great deal of study in remote control has been made concerns model aircraft, vehicles, or boats. Particularly in the case of model aircraft, it is essential that lightweight, reliable, and physically small equipment be used. It would be desirable also to have inexpensive apparatus with low current drain for such uses.

Many circuit combinations have been devised in the past, but for the most part, each has suffered from one or more defects. For example, a one-tube receiver utilizing a sub-miniature thyratron as a self-quenching super-regenerative detector has enjoyed some popularity. In this circuit, as in most simple circuits designed for remote control purposes, a relay in the plate circuit is operative in the reception of a radio signal to provide the desired control. Although this circuit has the advantages of economy in space, weight, and particularly battery drain, it is necessary to make frequent adjustments to obtain reliable operation. Also, tube life is short and the relatively small change in current through the relay coil in response to a received signal requires precise relay adjustment.

To increase useful tube life, an amplifier has been added to the above described circuit. The output of the amplifier in this case operates the relay. By means of random noise voltage from the detector the relay amplifier is biased to give plate current of low value. This bias is removed by the reception of a radio signal. Although this expedient increases tube life and provides a somewhat greater change of relay coil current, it has long been realized that longer thyratron tube life would be desirable as would more reliable operation of the thyratron as it ages.

Of course, less critical adjustment to obtain proper operation would also be a desirable improvement. Finally, it would greately improve present remote control systems if a circuit were provided to give control of another function, as for example, a second relay operative to give such control. Such an addition would be subject to the same limitations as the original circuit in that it would have to be light in weight, low in current drain, and capable of reliable operation without critical adjustment.

Therefore, it is an object of the present invention to provide a radio remote control circuit having long tube life.

It is another object to provide more reliable operation of radio remote control apparatus.

It is a further object to reduce plate current in the detector without substantial loss of sensitivity of the control circuit.

It is a still further object to provide substantial changes in relay coil current from no-signal to receiving-signal condition.

It is a still further object to provide a radio remote control circuit in which it is possible to control the operation of two separate relays to perform separate control functions.

In general, the present invention consists in a thyratron or vacuum tube radio frequency detector to which there is coupled an amplifier, the plate circuit of which controls a first relay. Additionally, there is coupled a second amplifier to the first relay, the second amplifier controlling a second relay. In the circuit, provision is made for feedback from the first amplifier to the thyratron. Also, coupling exists from the detector to the first amplifier such that a relatively low frequency oscillation of that circuit is obtained. The second amplifier is driven by the output of the first amplifier and it also has a relay in its plate circuit. The circuit is so arranged that the first relay is actuated by the reception of a radio signal which inhibits the low frequency oscillation. The second relay is actuated by pulses of voltage which are developed upon the cessation of the received radio signal. Alternatively, the circuit can be arranged such that the second relay is actuated by changes in pulse rate. For a better understanding of the invention, together with other and further objects, features, and advantages, reference should be made to the following description which is to be read in connection with the accompanying drawing in which:

Figure 1:
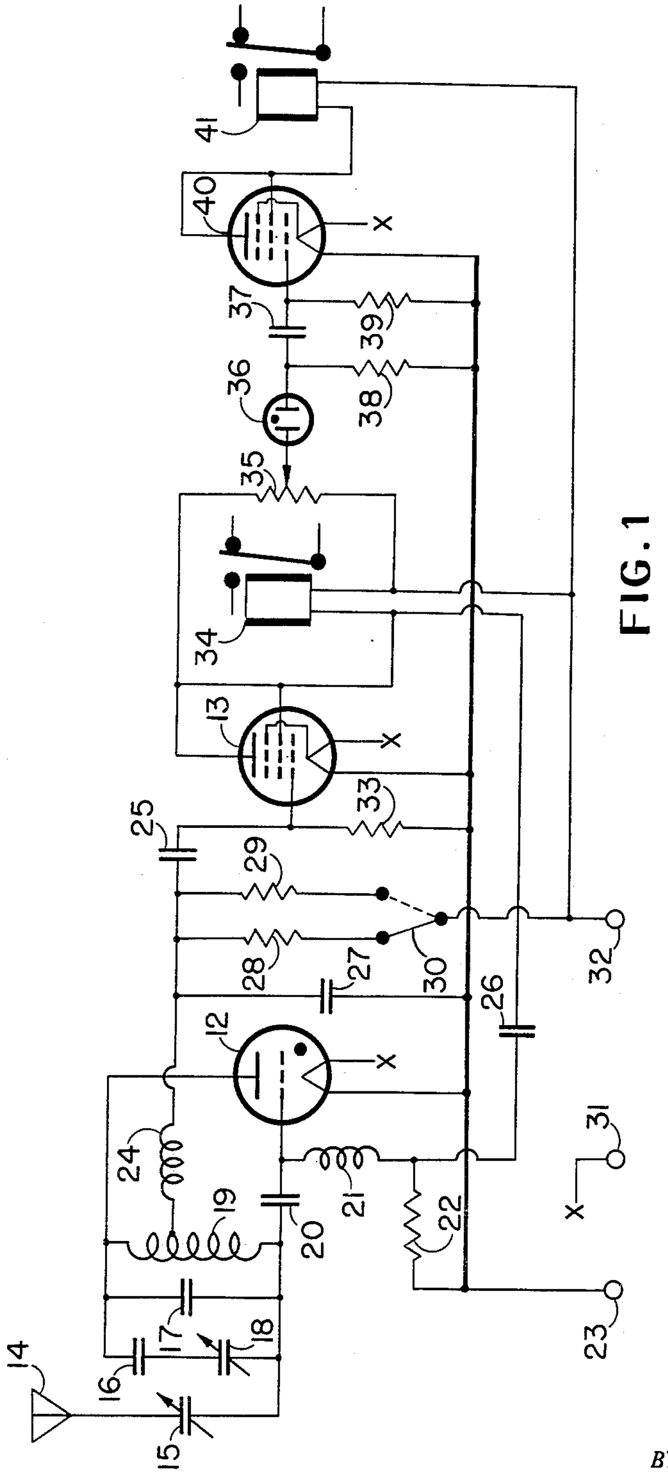
Fig. 1 is a complete schematic diagram of one embodiment of the invention.

Referring particularly to Fig. 1, a thyratron detector tube 12 and an amplifier 13 are shown. An antenna 14 is provided for the reception of radio signals, and a variable condenser 15 is connected to the antenna to provide means for radio frequency adjustment.

An oscillator tank circuit includes fixed condensers 16 and 17, variable condenser 18 for radio frequency tuning, and inductance 19. Coupling to the grid of thyratron detector 12 is through fixed condenser 20. A radio frequency choke coil 21 is connected between the grid of thyratron detector 12 and a grid leak resistor 22 which is returned to the common negative supply terminal 23. Inductance 19 is connected through a radio frequency choke 24 to a condenser 25 which couples the plate of thyratron detector 12 to the grid of amplifier 13.

A positive feedback loop is provided by condenser 26 from the plate of amplifier 13 to the grid of thyratron detector 12. A condenser 27 is connected in shunt with detector 12, and plate voltage is supplied through resistor 28 or 29, either of which may be selected by altering connection 30.

Filament voltages are supplied in the conventional manner from positive filament terminal 31 and common negative terminal 23. Plate voltage is derived from a positive plate terminal 32 and common negative terminal 23. Grid resistor 33 provides suitable bias to amplifier 13.

A normally open relay 34 is connected in the plate circuit of amplifier 13, and across relay 34 is a potentiometer 35. A neon bulb 36 is connected from the movable tap of potentiometer 35 to coupling condenser 37 and resistor 38. A second amplifier 40 derives its bias through a grid resistor 39 and has connected in its plate circuit a normally closed relay 41.

In the absence of a received signal, the apparatus is in a state of relatively low frequency relaxation oscillation. The relaxation oscillation is developed as follows. The plate of detector 12 reaches a voltage sufficient to initiate ionization in that tube. Condensers 25 and 27, of course, are simultaneously being charged to the value of the plate voltage. When ionization occurs, these condensers discharge through detector 12, and the voltage at the plate of detector 12 drops below that necessary to maintain ionization.

The exponential voltage decrease at the anode of detector 12 is coupled by condenser 25 to the grid of amplifier 13. The negative-going voltage at the grid of amplifier 13 appears at the plate of amplifier 13 inverted in form as a positive-going voltage, in which state it is coupled back to the grid of detector 12 through condenser 26. Grid voltage becomes positive and causes grid current to be drawn. Grid leak bias is developed by the flow of grid current through resistor 22.

Detector 12, having become deionized by the fall of plate voltage, is now susceptible of operation as a hard vacuum tube wherein the grid controls the flow of plate current. At the time of deionization, internal resistance of detector 12 is increased which, together with grid leak bias, inhibits the flow of plate current and permits the plate to become increasingly positive. Thus, feedback voltage coupled to detector 12 grid through condenser 26 becomes negative-going. Grid leak bias, being negative, is in phase with feedback voltage and the grid is driven negative. Simultaneously, condensers 25 and 27 regain their charge. The negative grid voltage then decreases and the entire cycle is repeated, as above, when detector 12 grid voltage reaches a value which permits ionization. The foregoing constitutes the relaxation oscillation present in the circuit with no signal being received.

Still another oscillation is present in the circuit with no signal being received. During those periods of the relaxation oscillation when the detector 12 is not ionized, the control grid of detector 12, as noted above, operates in the same manner as that of a high vacuum tube. For a part of this time, grid voltage is of such value that the circuit acts as a self-quenching super-regenerative receiver and oscillates at the quench or interruption frequency. The grid of detector 12 will acquire some negative bias due to the grid leak action of resistor 22 with quench frequency energy present, but this bias does not become sufficiently negative to prevent the cumulative ionization on which relaxation oscillation is dependent. During this no-signal period, the average plate current of amplifier 13 is of a low value and insufficient to cause actuation of relay 34 as it passes through the relay coil.

However, when a signal is received at antenna 14, negative bias at the grid of detector 12 increases by reason of the received signal and also by reason of the fact that the received signal causes an increase in the magnitude and frequency of the quench or interruption frequency energy at which the circuit is oscillating. The substantial increase of this bias (due to radio frequency energy) causes ionization to cease, plate current in detector 12 is greatly reduced, and relaxation oscillation substantially ceases.

Amplifier 13, because of negative bias developed by grid leak resistor 33 under no-signal conditions, normally has a low average flow of plate current. The decrease of plate current in detector 12 causes removal or reduction of this negative bias from amplifier 13, and plate current of amplifier 13 rises. The rising plate current flowing through the coil of relay 34 causes that relay to be actuated.

When the received signal ceases, a surge voltage which is of greater magnitude than that of the peak voltage of the relaxation oscillation is developed across the coil of relay 34. The direction of current flow through the coil of relay 34 being toward the plate of amplifier 13, the polarity of the surge, or back voltage, is positive at the junction of the plate of amplifier 13 and the coil of relay 34 when the removal of received signal causes a change from maximum to minimum current flow.

Potentiometer 35 has impressed upon it the surge voltage and the relaxation voltage, and the tap of potentiometer 35 is connected through the neon bulb 36 to the resistance-capacitance network formed by resistors 38 and 39 and condenser 37. Bulb 36 is selected to have an ionizing voltage less than the surge voltage which appears at the junction of plate of amplifier 13 and the coil of relay 34. Potentiometer 35 is set such that the ionizing voltage of bulb 36 is between peak relaxation voltage and peak surge voltage appearing across the bulb. Hence, neon bulb 36 fires only in response to surge voltage. Negative bias sufficient to cut off amplifier 40 is developed across grid leak resistor 39 normally, but when neon bulb 36 fires in response to surge voltage, the surge voltage, less the voltage drop across neon bulb 36 appears on the control grid of amplifier 40 causing it to conduct grid current briefly. During the firing period, condenser 37 is charged to substantially the surge voltage.

Thus, when neon bulb 36 deionizes as surge voltage drops below its firing voltage, condenser 37 discharges through resistors 38 and 39 connected in series therewith. The control grid of amplifier 40 is driven negative as condenser 37 discharges and plate current in amplifier 40 is cut off. The time constant of the discharge circuit is such that amplifier 40 remains cut off until the occurrence of another surge voltage pulse.

The brief duration of plate current flow in a single cycle through amplifier 40 is insufficient to actuate relay 41 in the plate circuit. Though the received signal may be present for a considerable length of time, no actuation of relay 41 will be had. Relay 41 is responsive only to surge voltage occurrences at a rate which can be predetermined. In effect, a pulse rate detector is provided for relay 41, and preferably, although not necessarily, by inclusion of a filter network of proper value at the input to amplifier 40, operation of relay 41 may be had at any reasonable change of pulse rate. For example, operation of relay 41 can be made such that pulses of radio energy being received at a rate of one per second will actuate relay 41, but pulses received at the rate of 12 per second will not actuate relay 41. In the case of a continuous signal, no pulses are received, and relay 41 is actuated.

Figure 2:
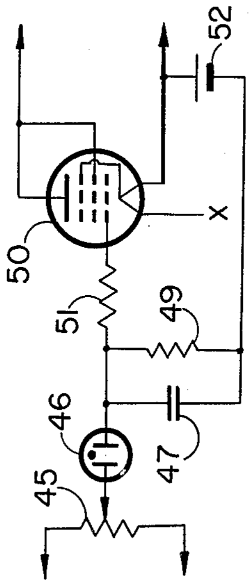
Fig. 2 is an alternative embodiment of one portion of the circuit of Fig. 1.

Referring now to Fig. 2, an alternative pulse detector circuit is shown. This circuit is designed for incorporation in the entire circuit of Fig. 1 wherein it replaces its counterpart. Here, a potentiometer 45 and neon bulb 46 serve the same purposes as potentiometer 35 and neon bulb 36 of the other pulse detector circuit. In Fig. 2, however, a battery 52 is connected from the cathode to the grid of amplifier 50 and provides fixed negative bias.

Operation of this circuit follows that previously described in most particulars except that applied surge voltage pulses cause plate current in amplifier 50 to flow, rather than to be cut off as previously described. Plate current in amplifier 50 is cut off in the absence of surge voltage by the negative grid bias provided by battery 52. When surge voltage causes firing of the neon bulb 46, condenser 47 charges directly from the battery 52. Upon deionization of bulb 46, condenser 47 discharges through resistor 49 in parallel with resistor 51 and the grid to filament resistance. Polarity of voltage across resistor 49 is such that discharge voltage removes bias voltage. Plate current through amplifier 50 and through the relay coil in circuit therewith becomes maximum and relay actuation is had each time a surge voltage pulse occurs. The relay is actuated for a time determined by the discharge time constant and will remain actuated when a sufficient number of voltage pulses occur in a given period.

It is possible to replace the thyratron detector 12 with a high vacuum tube. The operation of the circuit is identical to that of the thyratron type, although it is desirable that the feedback condenser be replaced by a variable condenser in order that relaxation or multivibrator action may be more easily controlled.

Operation of the remote control receiver is possible on any reasonable frequency band. It has been operated on the 27.255 mcs. citizens' band and on the 50–54 mcs.

amateur band, but is not by any means limited to such frequencies. The receiver is of standard construction and uses commercially available components throughout. Only the usual precautions are necessary in construction; for example, the radio frequency leads should be as short as possible, but otherwise, circuit layout is not critical.

Setting up the receiver for proper operation is easily done. Condenser 15 is set at minimum capacity with no signal present. This causes relaxation oscillation to be reduced to a negligible value and plate current through amplifier 13 is at a maximum value. Gradual increase of capacity by adjusting condenser 15 causes stable oscillation of the circuit and plate current through amplifier 13 is greatly reduced. The stability of oscillation is greatly enhanced by feedback from amplifier 13 to detector 12 through condenser 26.

Next, a radio signal is provided and condenser 18 is adjusted until proper resonant tuning of the tank circuit is obtained. This results in the plate current of amplifier 13 becoming maximum again. Only a minor amount of interaction exists between condenser 15 and the tuning of the tank circuit by condenser 18 and this is easily compensated for by small readjustments of the condensers. Neon bulb 36 serves the purpose previously discussed and also indicates the presence of voltage across the coil of relay 34 to facilitate receiver adjustment and tuning.

This invention should not be limited to the exact details disclosed, these being primarily for illustrative purposes, but only by the spirit and scope of the appended claims.

What is claimed is:

1. Radio remote control apparatus comprising, a detector stage, an amplifier stage coupled to said detector stage, means for feeding back the output of said amplifier stage to the input of said detector stage in phase to cause sustained oscillation in said detector and amplifier stages, means for developing negative bias on said amplifier stage in response to said oscillation, means for receiving a transmitted radio signal, means for introducing said radio signal to said detector stage to inhibit said oscillation and remove negtive bias from said amplifier stage, and a relay coil, the output of said amplifier stage passing through said relay coil, whereby relatively low current normally passes through said relay coil and relatively high current passes through said relay coil during reception of a transmitted radio signal.

2. Radio remote control apparatus comprising, a detector stage having input and output circuits, an amplifier stage having input and output circuits, means for coupling the output circuit of said detector stage to the input circuit of said amplifier stage, means for coupling the ouput circuit of said amplifier stage to the input circuit of said detector stage whereby oscillations are generated, means in the input circuit of said amplifier stage responsive to said oscillations to provide bias on said amplifier stage for holding average current in the output stage of said amplifier at a relatively low level, means for receiving a transmitted radio signal, means for coupling said radio signal to said detector stage to inhibit generation of said oscillations, decrease of said oscillations causing substantial removal of said bias from the input stage of said amplifier and increase in the average current in the output stage of said amplifier, and a relay having a coil thereof connected in the output stage of said amplifier, increased current through said relay coil causing actuation of said relay during reception of said transmitted radio signal.

3. Apparatus as in claim 2 including a pulse rate detector connected across said relay coil, said pulse rate detector comprising, a second amplifier stage having input and output circuits, means for applying voltage pulses of a predetermined magnitude to said input circuit of said second amplifier stage, means for normally biasing said second amplifier stage in a substantially non-conducting condition, a normally unactuated second relay having its coil connected in said output circuit of said second amplifier stage, and means in said input circuit for removing said bias on said second amplifier stage to cause conduction thereof and actuation of said second relay in response to the occurrence of said voltage pulses of predetermined magnitude at a predetermined repetition rate.

4. Radio remote control apparatus comprising, a two-stage relaxation oscillation circuit, a relay having its coil connected in said relaxation oscillation circuit, means for limiting current through said coil to a relatively low average value during the occurrence of relaxation oscillation, means for introducing a received radio signal into said relaxation oscillation circuit to inhibit relaxation oscillation, and means for increasing current through said relay coil to a relatively high value during introduction of said received radio signal.

5. Radio remote control apparatus comprising, a gaseous discharge tube having input and output circuits, a first amplifier tube having input and output circuits, means for coupling the output circuit of said gaseous discharge tube to the input circuit of said first amplifier tube, and means for coupling the output circuit of said first amplifier tube to the input circuit of said gaseous discharge tube to generate oscillations, a grid leak for generating bias voltage in the input circuit of said first amplifier tube in response to said oscillations, means for introducing a received radio signal into the input circuit of said gaseous discharge tube to inhibit said oscillations, a normally unactuated first relay having its coil connected in the output circuit of said first amplifier tube, inhibition of said oscillations causing removal of said bias voltage and increased current in said output circuit of said first amplifier tube and in said relay coil to cause actuation of said relay, reduction of current in said relay coil upon cessation of reception of said radio signal causing generation of voltage pulses, a pulse rate detector including a second amplifier tube and a normally unactuated second relay having its coil connected to the output of said second amplifier tube, and means for causing increase in current through said second amplifier tube and said second relay coil and actuation of said relay in response to the occurence of said voltage pulses of a predetermined magnitude at a predetermined repetition rate.

6. Radio remote control apparatus comprising, a gaseous discharge tube, a first amplifier tube and a second amplifier tube, circuit components connected to said gaseous discharge tube and said first amplifier tube to cause relaxation oscillations and self-quenching super-regenerative oscillations, a first relay having its coil connected in the output circuit of said first amplifier tube, a second relay having its coil connected in the output circuit of said second amplifier tube, said first amplifier tube being self-biased by said relaxation oscillations, a receiving circuit responsive to a signal, means for coupling said signal from said receiving circuit to said gaseous discharge tube to inhibit said relaxation oscillations and thereby cause removal of self-bias on said first amplifier, current in said first amplifier and through said first relay coil becoming of sufficient magnitude to actuate said first relay upon removal of said self-bias, means in the input circuit of said second amplifier for normally biasing said second amplifier against conduction, a normally unactuated second relay having its coil connected in the output circuit of said second amplifier, and means for coupling voltage pulses generated in said coil of said first relay by interruptions of said signal to the input circuit of said second amplifier, removal of bias and actuation of said second relay being effected by voltage pulses of a predetermined magnitude and predetermined repetition rate appearing at said last-mentioned means.

7. Radio remote control apparatus comprising, a self-quenched super-regenerative detector having input and output circuits, a first amplifier having input and output circuits, means for coupling the output circuit of said detector to the input circuit of said first amplifier, and means for coupling the output circuit of said first amplifier to the input circuit of said detector whereby relaxation oscillations are generated in said detector and said first amplifier, a grid leak in the input circuit of said first amplifier, negative bias being developed by said grid leak in response to said relaxation oscillations, a first relay having its coil connected in the output circuit of said first amplifier, said relay being unactuated by the relatively small current flowing in the output circuit of said first amplifier during the presence of said negative bias, a second amplifier having input and output circuits, means for normally maintaining negative bias on said second amplifier, a normally unactuated second relay connected in the output circuit of said second amplifier, means for receiving a transmitted radio signal, and means for coupling said radio signal from said receiving means to said detector, said signal causing reduction of said relaxation oscillations and removal of negative bias from said first amplifier and relatively large current flow in the output circuit of said first amplifier, whereby said first relay is actuated, cessations of said radio signal causing back-voltage pulses to be generated by the coil of said first relay, negative bias on said second amplifier being removed by pulses of a predetermined magnitude and repetition rate, increased flow of current in the output circuit of said second amplifier in response to removal of said negative bias causing actuation of said second relay.

8. Radio remote control apparatus comprising, a self-quenched super-regenerative detector circuit, a first amplifier circuit, a second amplifier circuit, a first control device responsive to current changes in said first amplifier circuit, a second control device responsive to current changes in said second amplifier circuit, means for normally generating relaxation oscillations in said detector and first amplifier circuits, means for inhibiting said relaxation oscillations in response to received signals to cause current changes in said first amplifier circuit and corresponding changes in said first control device, and means responsive to voltage pulses of a predetermined magnitude and repetition rate generated by the cessation of said received radio signals in said first control device, said second amplifier circuit being coupled to said last-mentioned means, and being responsive in current changes to said voltage pulses, whereby changes are effected in said second control device.

9. Radio remote control apparatus comprising, a self-quenched super-regenerative detector circuit, a first amplifier circuit, a second amplifier circuit, a first control device responsive to current changes in said first amplifier circuit, a second control device responsive to current changes in said second amplifier circuit, means for coupling energy between said detector circuit and said first amplifier circuit to generate relaxation oscillations in said detector and first amplifier circuits, means for receiving a radio signal, means for introducing said radio signal to said detector circuit to inhibit said relaxation oscillations whereby current flow in said first amplifier circuit is changed and said first control device responds, means for generating voltage pulses in response to changes in said first control device, and means for introducing said voltage pulses into said second amplifier circuit to cause current changes therein and response of said second control device.

References Cited in the file of this patent

UNITED STATES PATENTS

| | | |
|---|---|---|
| 1,968,750 | Edwards et al. | July 31, 1934 |
| 2,228,163 | Cohn | Jan. 7, 1941 |
| 2,511,409 | Mayberry | June 13, 1950 |

FOREIGN PATENTS

| | | |
|---|---|---|
| 653,875 | Germany | Dec. 9, 1937 |

OTHER REFERENCES

"Electronics," September 1947, pages 114–116.